United States Patent [19]

Tan et al.

[11] Patent Number: 4,648,783

[45] Date of Patent: Mar. 10, 1987

[54] EDUCATIONAL AND LABORATORY WORK CELL FOR A ROBOTIC DEVICE

[76] Inventors: Patrick Tan, 8651 NW. 1st, Coral Springs, Fla. 33065; Peter Maitland, 1821 SE. 21st Ave., Pompano Beach, Fla. 33062; Gregory Kawczynski, 5620 NE. 18 Ave., Apt. 4, Fort Lauderdale, Fla. 33334; Paul V. Camposeo, 6875 NW. 9th St., Margate, Fla. 33063

[21] Appl. No.: 668,747

[22] Filed: Nov. 6, 1984

[51] Int. Cl.⁴ .............................................. B25J 9/00
[52] U.S. Cl. ........................................ 414/730; 901/4; 901/49; 901/50; 414/222
[58] Field of Search ..................... 901/4, 6, 49, 50, 34; 414/749, 730, 222; 269/56, 309, 310

[56] References Cited

U.S. PATENT DOCUMENTS 3,241,687 3/1966 Orloff ................................ 901/34 X
4,538,950 9/1985 Shiomi et al. ................... 414/749 X

FOREIGN PATENT DOCUMENTS 3211992 10/1983 Fed. Rep. of Germany .......... 901/4
54-3761 12/1979 Japan ..................................... 901/49

Primary Examiner—Terrance L. Siemens
Attorney, Agent, or Firm—Eugene F. Malin

[57] ABSTRACT

A robotic cell, or work area, especially useful for education. The cell has a plurality of interchangable work surfaces for mounting objects that the robot manipulates. Students, researchers, or other workers can thus set up separate experiments that need not be torn down each time a different user begins work with the cell. The cell has safety switches that encourage a user, when near the robot, to keep a hand on the robot so as not to be accidentally injured by the robot's motion. There is also a dead man switch effective to disenable the robot entirely, after a short time delay. The cell has a pneumatic control circuit that enables a user to position the robot's gripper arm at positions intermediate of fully up and fully down.

12 Claims, 7 Drawing Figures

EDUCATIONAL AND LABORATORY WORK CELL FOR A ROBOTIC DEVICE

BACKGROUND OF THE INVENTION

Any but the most simple of today's robotic devices are expensive. Unfortunately, the kind of robotic devices commonly used for education in technical schools most often are dedicated to one particular use, and cannot be used simultaneously for different projects. Worse yet, because typically such projects require individual laboratory set-ups before employing the robotic device, users cannot minimize the time wasted in using a dedicated robot by, at least, setting up their experiments before approaching the robot, but must wait until the robot is free, then set up their experiment, and then execute their experiment while others wait. Similarly, if other work such as research is in progress, this must also be torn down so that these laboratory exercises can proceed. This necessitates such a technical school losing countless man hours of productivity, and can well adversely affect an instructor's morale if it is his own research work it must be repeatedly disrupted destroyed in mid-course simply to accomodate a student laboratory.

Moreover, such robotic devices are dangerous. These devices usually have at least one articulated cantilevered arm having a gripper device that, typically, has a pneumatic drive to move the gripper linearly. As such, a robotic arm swings horizontally across a work area, and with the considerable inertia carried by such an arm, an unwary worker struck by such an arm can experience considerable injury.

Additionally, the vertically moving gripper arm is, to an extent, unwieldy because these pneumatic arms conventionally have only two positions: completely up or completely down, and lack fine position control to enable a worker or student to manually position the gripper arm intermediate of its two extremes. Present robot arms are repeatable, but not accurate. That is, if a robot arm would go to one point in space responsive to a positioning command, the robot can return to that point responsive to the same command with great precision (good repeatability). However, if one would attempt to direct the arm to this point by pre-programming the point's coordinates, the robot will likely move only to the vicinity of the point (poor accuracy). For this reason, robotic routines are pre-programmed with position coordinates vacant, and these coordinates input by moving the robot by hand to the coordinates. This is called "teaching" the robot. If the robot's routine calls for manipulating small objects, or performing movements having small tolerances for error, it would be a great advantage to have fine control over the arm that must manipulate these objects so that the arm may be moved to points intermediate of its two extreme positions, thus simplifying the "teaching" process.

SUMMARY OF THE INVENTION

Accordingly, it is an object of this invention to provide a robot work cell especially useful for educating students in the use of robot devices.

It is a further object of this invention to provide such a work cell that enables a plurality of students or other workers to work on plural projects simultaneously.

It is a further object of this invention to provide such a work cell having modular, replaceable, work areas to enable different users to work simultaneously on assembling several projects.

It is a further object of this invention to provide such a cell that protects users against injury by unexpected motion of the robot.

It is a further object of this invention to provide a fine control for positioning the robot's gripper arm.

In accordance with these and other objects that shall become apparent hereinafter, there is provided a modular cell, or work area, having such a conventional cantilevered robotic arm disposed over a work table. A portion of the table top is removable, and the frame upon which the table top and robotic arm is mounted has a space enclosing a rack for holding a plurality of interchangeable table tops. Because these table top sections are interchangeable, students, professors, or other users of the robot cell can set up their experiments remotely on these table tops, and store their experimental setups at the cell until each individual student or worker has his turn at the robot cell. Pneumatic feed for the vertical control of the gripper arms is provided with a fine, manually operated, bleed circuit to allow the user fine control over the arm's vertical position. The robot cell is surrounded by a safety mat which serves to disenable the robot after a user steps on the mat. A dead man switch is disposed on the robot itself, and, when pressed by the user, reenables the robot. This combination of switches encourages the user to keep a hand on the robot when in the robot's vicinity (e.g. "teaching" the robot) so that, if the arm moves in a manner unexpected by the user, the user is pushed out of the robot's way, and, if the user is not fully pushed out of danger, the user is nonetheless protected from severe injury by releasing the dead man switch.

DETAILED DESCRIPTION OF THE PREFERRED EMBODIMENT

Figure 1:
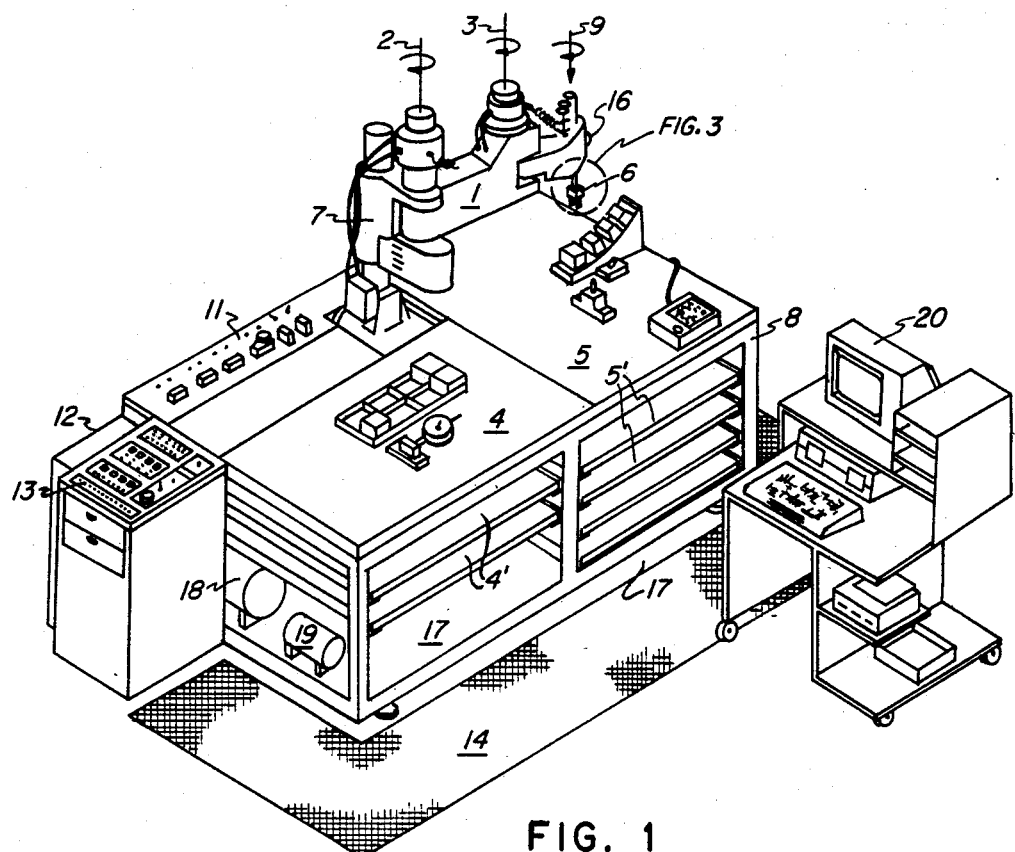
FIG. 1 is an elevational isometric view of the work cell of the instant invention.
Figure 2:
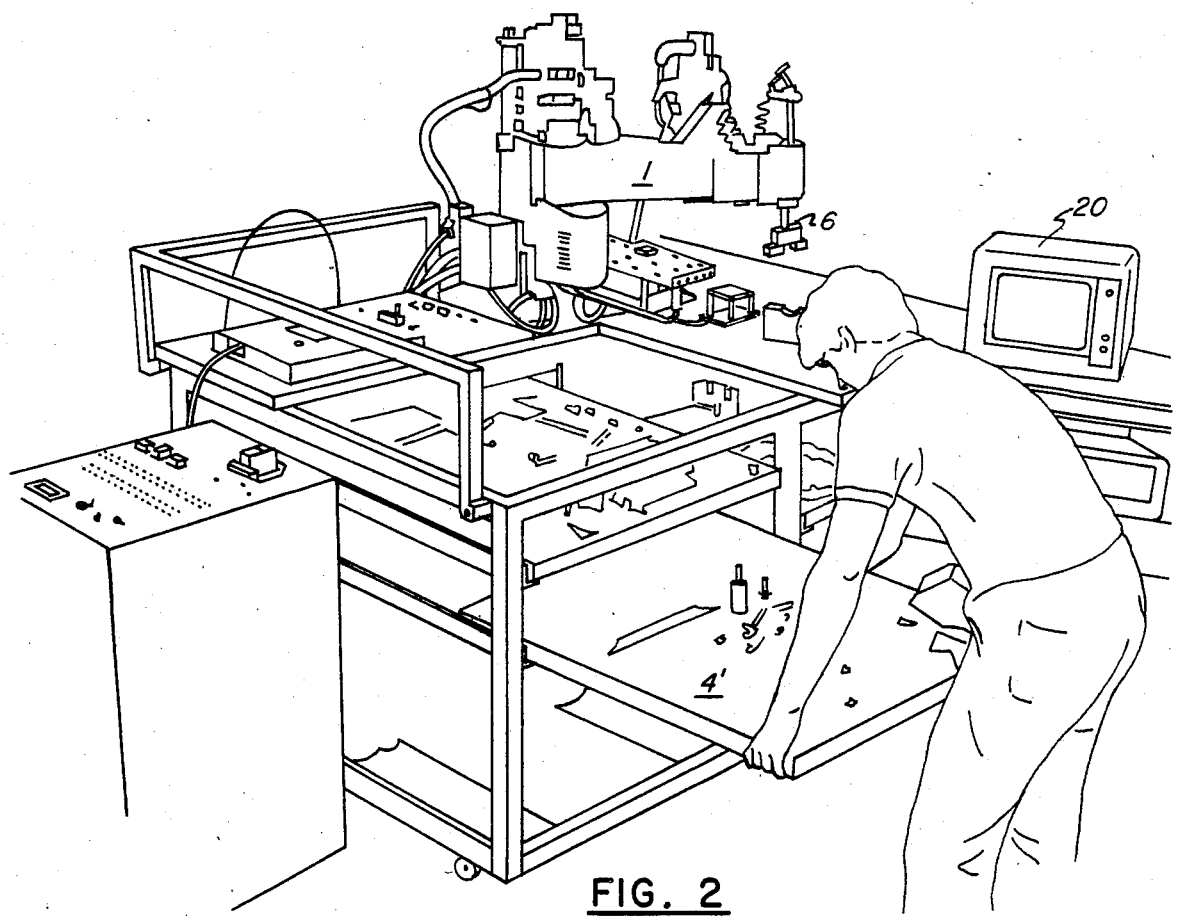
FIG. 2 is a view as in FIG. 1, illustrating the modular features of the instant invention.
Figure 3:
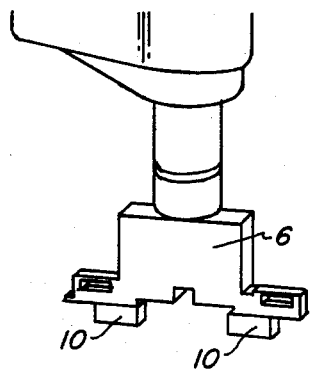
FIG. 3 is a detail of the gripper arm encircled in FIG. 1.

With particular reference to the drawing figures, especially FIGS. 1 and 3, there is shown a work cell, or area, for using robotic arm 1. Robotic arm 1 is double articulated about axis 2 and 3 so as to be able to sweep across table surfaces 4, 5 to manipulate objects disposed atop table tops 4, 5 by means of pneumatically operated gripper arm 6. Robot arm 1 is mounted adjacent table tops 4, 5 on pedestal 7. Pedestal 7 and table tops 4, 5, as well as other structure are mounted upon a frame structure 8, more about which below.

Robot arm 1 has a third axis 9 along which gripper arm 6 moves vertically to access objects disposed on table tops 4, 5. Gripper arm 6 also can rotate about axis 9 so as to better position its caliper arms 10 for grasping objects on the table tops. Table tops 4, 5 typically have screw holes pre-cut in them so the various objects located on table tops 4, 5 can be fixed to these table tops with respect to the robot arm 1 for repetitive operations executed by robot arm 1. To help position object securely on table tops 4, 5, one can use blocks or chocks screwed into table tops 4, 5. These blocks or chocks are preferably made of unexpensive and relatively frangible material so that, if the robot gripper arm 6 were to accidentally crash into such a block or chock, the inexpensive block or chock would break rather than the expensive gripper arm 6. Robot arm 1 can advantageously be an IBM Model 7535 robot, the robot arm alone constituting no part of this invention. The operation and programming of this robot, and others of a similar nature, is well known as is readily apparent to those skilled in the art Located on frame 8 is a control panel 11 housing the pneumatic and solenoid valves that control movement of auxiliary devices located on table tops 4, 5, such as pneumatic vises or pneumatic indexing devices.

Electrical interface panel 13 serves as an input-output conduit between controller 12, and the robot 1 and pneumatic control panel 11. Panel 13 also serves as the point through which electric power for the cell is channelled and controlled.

Disposed next to frame 8 is a robot controller 12. Controller 12 preferably contains a computer unit which directly controls the movements of robot arm 1 in accordance with a preprogrammed routine. Preferably, individual routines for robot arm 1 are encoded and compiled in computer 20, or an off-line equivalent to 20, and loaded into controller 12 where the routine is ready to direct arm 1.

Similar to the robots discussed above, the electrical configuration, programming and operation of the computer, the control unit and any related ancillary equipment is also well known to those skilled in the art.

Frame 8 is surrounded by safety mat 14, which is a pressure sensitive switch effective to disenable operation of the robot arm upon the switch being made, and whose function is to stop movement of robot arm 1 if anyone approaches near the work cell. This is a safety feature to prevent the injury that would occur if someone were inadvertently hit by robot arm 1 as it swept across table tops 4, 5. Robot arm 1 has an additional safety switch 16, which is a dead man's switch. Upon being pressed, switch 16 re-enables robot arm 1 despite the switch of safety mat 14 being connected. This is necessary because programming and teaching of the robotic arm frequently necessitates one to be near, or to grab and directly move, robot arm 1. Switches 14 and 16 together encourage a user to keep a hand on robot 1 so as not to be tken by surprise by an unexpected movement of arm 1. If such an unexpected movement were to occur, the user would be pushed away, likely without injury, rather than struck by arm 1.

For the convenience of the user, there is programmed into the robot a five second delay between the mat switch 14 being made and the robot arm being disenabled so that the arm is not repeatedly disenabled during use, or disenabled when the user first steps on, or steps off the safety mat.

Located beneath table tops 4, 5 on frame 8 is a plurality of storage spaces 17 for housing additional table tops 4', 5'. These additional table tops 4', 5' are suspended on frame 8 in any conventional shelving manner that would allow a user to easily slide and replace the table tops 4', 5' in and out easily, an example of which is a simple mounting bracket. Additional table tops 4', 5' will be exactly the same size and shape as table tops 4, 5, and will have dimensions with tolerances significantly smaller than the expected placement error of robot arm 1. The purpose of this is to make all table tops 4, 4' and, 5, 5' virtually interchangeable so that, after a user of robot arm 1 has finished one experiment, another experiment could be quickly set-up merely by interchanging table top 4 and a selected one of table tops 4', eliminating the necessity to tear down whatever experiment was set-up in order to do the next. This would be particularly advantageous in an educational environment, where such a robot arm would be used at one time for a professor's research, and at another time for a hands-on laboratory in which many different students would have to do the same experiment and the teacher would have to evaluate these experiments.

In use, a typical sequence of events would be as follows: Before class, all students would set up their experiments on individual table tops 4', 5' and encode and compile their laboratory routines for robotic arm 1 on an off-line computer 20, typically recording this on a diskette. A fist student would then proceed to input his program, and load it into robot controller 12. The first student would then proceed to input location coordinates ito his program by hand manipulation of robot arm 1, and subsequent students would then repeat this procedure sequentially. After each student has thus perfected his program at computers 12 and 20, each student's experimental apparatus attached to individual table tops 4', 5', can be placed under frame 8 in space 17 for later evaluation by the professor. The professor could, at his leisure, place each of his students' experimental set-ups 4', 5', atop frame 8, run each students' program stored in robot controller 12's memory, and critique each students' work. When this is done, the professor can then replace his own table tops 4, 5, having his own experimental set-up, and continue his research work. It is submitted that the time and effort that can be saved by this work cell arrangement, obviating as it does the necessity of tearing down an experimental set-up each time the work cell is used for another purpose, and further obviating the need for each student in a laboratory class to do his work sequentially, rather than simultaneously, is great.

With special reference to FIG. 4, there is shown the pneumatic air supply for gripper arm 6. The portion of the air supply that moves caliper arms 10 is not shown. Caliper 6 is moved vertically along axis 9 by air piston 30 disposed in piston cylinder 31 having pressure sides 32 and 33. By inspection of FIG. 4, it is seen that if side 32 is at higher pressure than side 33 piston 30 moves downwards, and if side 33 has greater pressure, piston 33 moves upwards. This corresponds to downward and upward movement respectively of gripper arm 6.

Figure 4A:
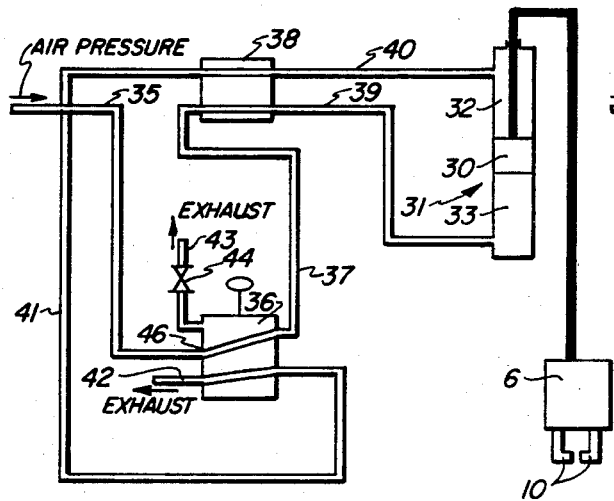
FIG. 4a is a schematic of a pneumatic circuit configuration of the invention.
Figure 4B:
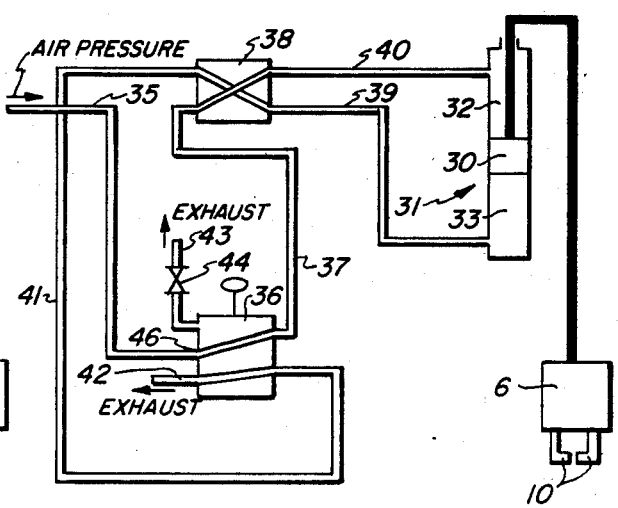
FIG. 4b is a schematic of an alternative embodiment of the pneumatic circuit configuration of the invention.
Figure 4C:
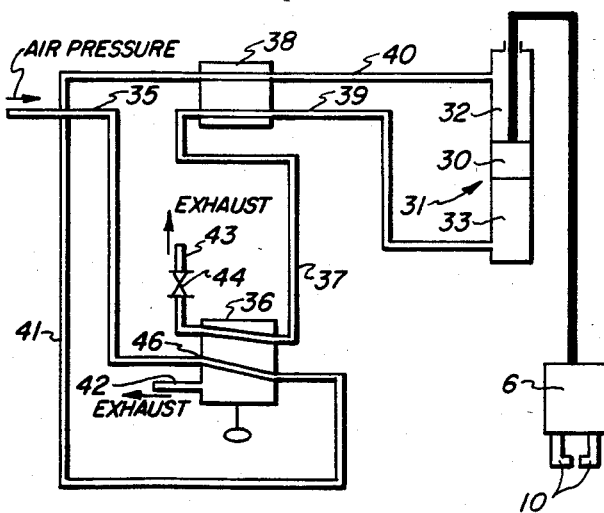
FIG. 4c is a schematic of an alternative embodiment of the pneumatic circuit configuration of the invention.
Figure 4D:
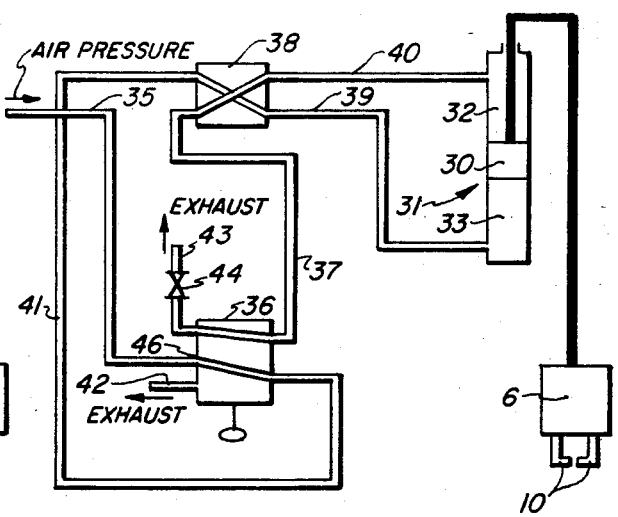
FIG. 4d is a schematic of an alternative embodiment of the pneumatic circuit configuration of the invention.

Air pressure enters the supply system at 34. Pressure can come ultimately from any conventional source, such as air reservoir 18, (illustrated in FIG. 1). The air supply circuit is shown in FIGS. 4a to 4d, and has in it two pneumatic control valves 36 and 38. Valve 38 has two input and two output ports, and can be switched between two positions, one of which is shown in FIGS. 4a and 4c, the other of which is shown in FIGS. 4b and 4d. The function of valve 38 is to switch lines 37 and 41 between pneumatic connection with portions 32 and 33 of cylinder 31. If one of lines 37 and 41 were at high pressure, and the other at exhaust, switching of valve 38 between the positions shown in FIGS. 4a, 4c, and FIGS. 4b, 4d, reverses the pressure in cylinder 31, causing piston 31 and gripper arm 6 to reverse position between fully up and fully down. Switching of valve 38 is ultimately controlled by controller 12, and whatever computer routine is being run by controller 12.

Valve 36 is a five port pneumatic valve that also switches between two positions, one of which is shown in FIGS. 4a and 4b, the other of which is shown in FIGS. 4c and 4d. In the position of FIGS. 4a, 4b, high pressure is delivered to valve 38 by connection of lines 35 and 37, and exhaust by lines 41 and 42. In this position, valve 36 constitutes an air conduit for valve 38, and switching of valve 38 operates merely to switch gripper arm 6 between its completely up and down position.

In valve 36's position of FIGS. 4c, 4d, the high pressure and exhaust connections are reversed, with line 41 connected to high pressure line 35 via port 46, and line 37 connected to exhaust line 43. Mere switching of valve 36 would not, of itself, alter the position of gripper arm 6, because exhaust line 43 is blocked by normally closed bleed-off valve 44. By hand operating bleed-off valve 44 (which preferably has a toggle arm for this purpose), one can exert fine control over the position of gripper arm 6 along axis 9. The four operating states represented by FIGS. 4a to 4d are as follows:

FIGURE

4a: Gripper arm 6 up, with no ability to finely position arm 6.

4b: Gripper arm 6 down, with no ability to finely position arm 6.

4c: Gripper arm 6 down, with ability to finely position arm 6.

4d: Gripper arm 6 up, with ability to finely position arm 6.

The foregoing description deals entirely with one kind of robot. There are others, examples of which are known as cylindrical, spherical, cartesian, and jointed robots, as workers in this art know. The first three locate gripper arms in space by motions along directional axes from familiar cylindrical, sphrical, and rectangular coordinates respectively. The last is a variation of the spherical type, but with extra joints for additional rotation in additional planes. But the feature common to all such robot arms is that a manipulative arm is located to preselected points in three-space above a work surface. As such, practice of the invention disclosed herein is not limited to the use of the particular robot disclosed herein, but is useable with any robot that can manipulate objects resting on any surface. Indeed, the instant invention is disclosed herein in what is thought to be the most practical and prefered embodiment; it is understood, however, that the instant invention is capable of application beyond the particulars set forth in the Detailed Description, and that obvious modifications will occur to those skilled in this art. Accordingly, the scope of the instant invention is to be discerned by reference to the appended claims, wherein:

What is claimed is:

1. A robotic cell for educational and laboratory work, comprising:
   a support table having a frame and upper surface means for supporting selected objects, said frame supporting said upper surface means;
   a robot having moveable arm means, said robot mounted to said support table, said arm means for manipulating said selected objects on said upper surface means;
   said upper surface means including at least one removable modular section, said removable modular section readily interchangeable with one of a plurality of modular sections;
   said support table including housing means, said housing means storing a plurality of modular sections beneath said upper surface means;
   each of said plurality of modular sections capable of supporting a discrete group of selected objects;
   whereby said plurality of interchangeable modular sections allow quick and efficient transposing of selected objects subject to manipulation by said robot arm means.

2. The apparatus of claim 1 wherein:
   said upper surface includes a plurality of removable modular sections, each of said removable modular sections readily interchangeable with one of a plurality of modular sections;
   said support table housing said plurality of modular sections beneath said upper surface means.

3. The apparatus of claim 2 wherein at least two of said plurality of removable modular sections are of a different size.

4. The apparatus of claim 1 wherein:
   said modular sections are generally rectangular, planar sections;
   said frame being dimensioned to receive and frictionally hold said removable modular sections of said upper surface means.

5. The apparatus of claim 1 wherein said housing means comprises a plurality of support members connected to said frame beneath said upper surface means, said plurality of modular sections slidably engaging, and held by, said support members, said plurality of modular sections being housed in a horizontal position, one above the other whereby a given section can readily be interchanged with said upper surface modular section.

6. The apparatus of claim 1 wherein said moveable arm means includes a gripper arm, said gripper arm being moveable being two extreme positions, and pneumatic means for interposing said gripper arm between said extreme positions.

7. The apparatus of claim 6 wherein said pneumatic means controls the vertical position of said gripper arm, said pneumatic means including a plurality of control valves, said pneumatic means driving a piston which positions said gripper arm.

8. The apparatus of claim 7 wherein said pneumatic means includes a first valve, a second valve, and a plurality of pneumatic lines, said first valve primarily controlling the direction of travel of said gripper arm between said extreme positions, said second valve being capable of controlling with precision the position of said gripper arm intermediate said extreme positions, said valves being multiport devices, each valve capable of changing the input and output configuration thereof, said pneumatic valves controlling the configuration of said pneumatic lines,
   whereby said pneumatic means is capable of a plurality of configurations controlling the positioning of said gripper arm.

9. The apparatus of claim 1 further comprising means for disenabling operation of said robot responsive to a user being within a preselected area of said robot;
   interactive switch means for overriding said disenabling means, whereby said disenabling means and said interactive switch means act in concert to allow operation of said robot, thereby protecting the operator.

10. The apparatus of claim 9 wherein said disenabling means comprises a preselected safety area positioned on the floor in proximity of said support table, said safety area being a pressure sensitive switch disenabling operation of said robot upon a user entering said safety area.

11. The apparatus of claim 9 wherein said interactive switch is positioned upon said moveable arm means, said interactive switch requiring a user to continuously engage said switch to operate said robot, whereby a user is constantly aware of the position of said robot, thereby avoiding serious bodily harm to said user.

12. A robotic cell for educational and laboratory work, comprising:
   a support table having a frame and upper surface means for supporting selected objects, said frame supporting said upper surface means;
   a robot having movable arm means, said robot mounted to said suport table, said arm means for manipulating said selected objects on said upper surface means;
   said upper surface means including at least one removable modular section, said removable modular section readily interchangeable with one of a plurality of modular sections, each of said plurality of modular sections capable of supporting a discrete group of selected objects;
   said modular sections being generally rectangular, planar sections;
   said support table including housing means, said housing means storing a plurality of modular sections beneath said upper surface means;
   said support table housing said plurality of modular sections beneath said upper surface means;
   said frame being dimensioned to receive and frictionally hold said removable modular sections of said upper surface means;
   said housing means comprising a plurality of support members connected to said frame beneath said upper surface means, said plurality of modular sections slidably engaging, and held by, said support members, said plurality of modular sections housed in a horizontal position, one above the other;
   said movable arm means including a gripper arm; said gripper arm being movable between two extreme positions, and pneumatic means for interposing said gripper arm between said extreme positions;
   said pneumatic means controlling the vertical position of said gripper arm, said pneumatic means including a plurality of control valves, said pneumatic means driving a piston which positions said gripper arm;
   said pneumatic means including a first valve, a second valve, and a plurality of pneumatic lines, said first valve primarily controlling the direction of travel of said gripper arm between said extreme positions, said second valve being capable of controlling with precision the position of said gripper arm intermediate said extreme positions, said valves being multiport devices, each valve capable of changing the input and output configuration thereof, said pneumatic valves controlling the configuration of said pneumatic lines; and
   a means for disenabling operation of said robot responsive to the user being within a preselected area of said robot with interactive switch means for overriding said disenabling means, said disenabling means comprising a preselected safety area positioned on the floor in proximity of said support table, said safety area being a pressure sensitive switch disenabling operation of said robot upon the user entering said safety area;
   said interactive switch being positioned upon said movable arm means, said interactive switch requiring a user to continuously engage said switch to operate said robot, whereby a user is constantly aware of the position of said robot, thereby avoiding serious bodily harm to said user.

* * * * *